Jan. 10, 1950 W. E. TAIT ET AL 2,494,495
ROTARY FILM HOLDER
Filed June 20, 1945 4 Sheets-Sheet 4
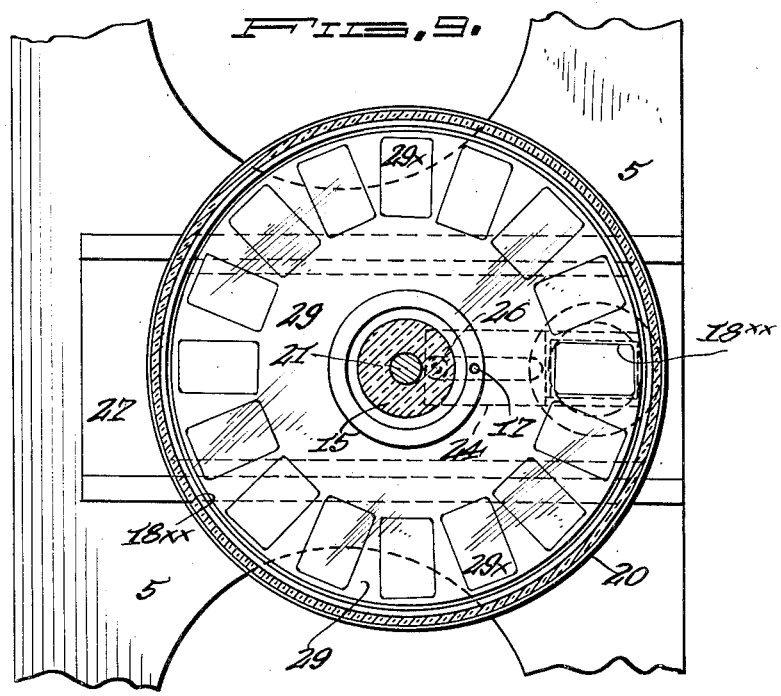
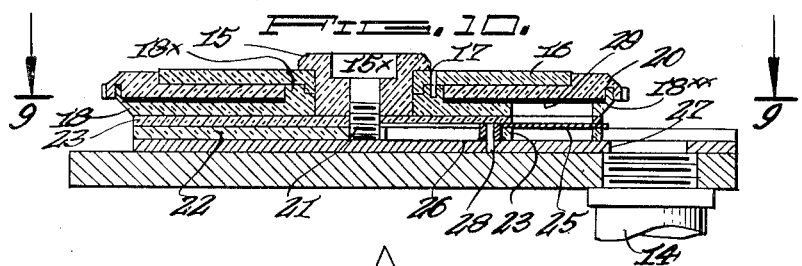
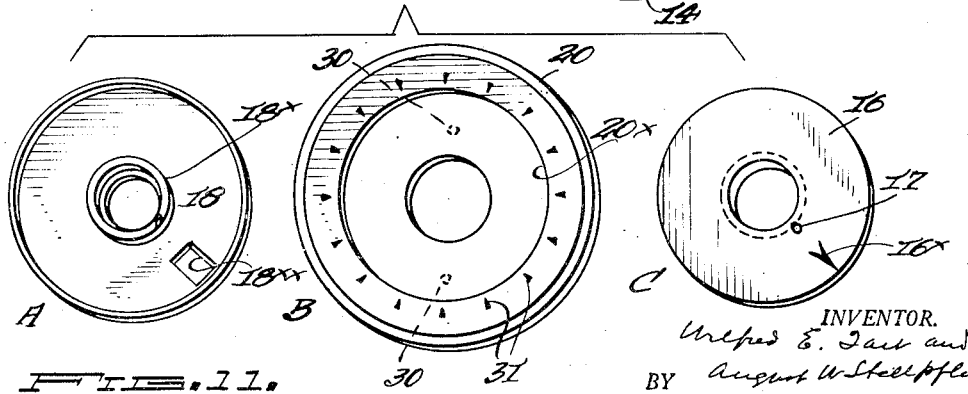

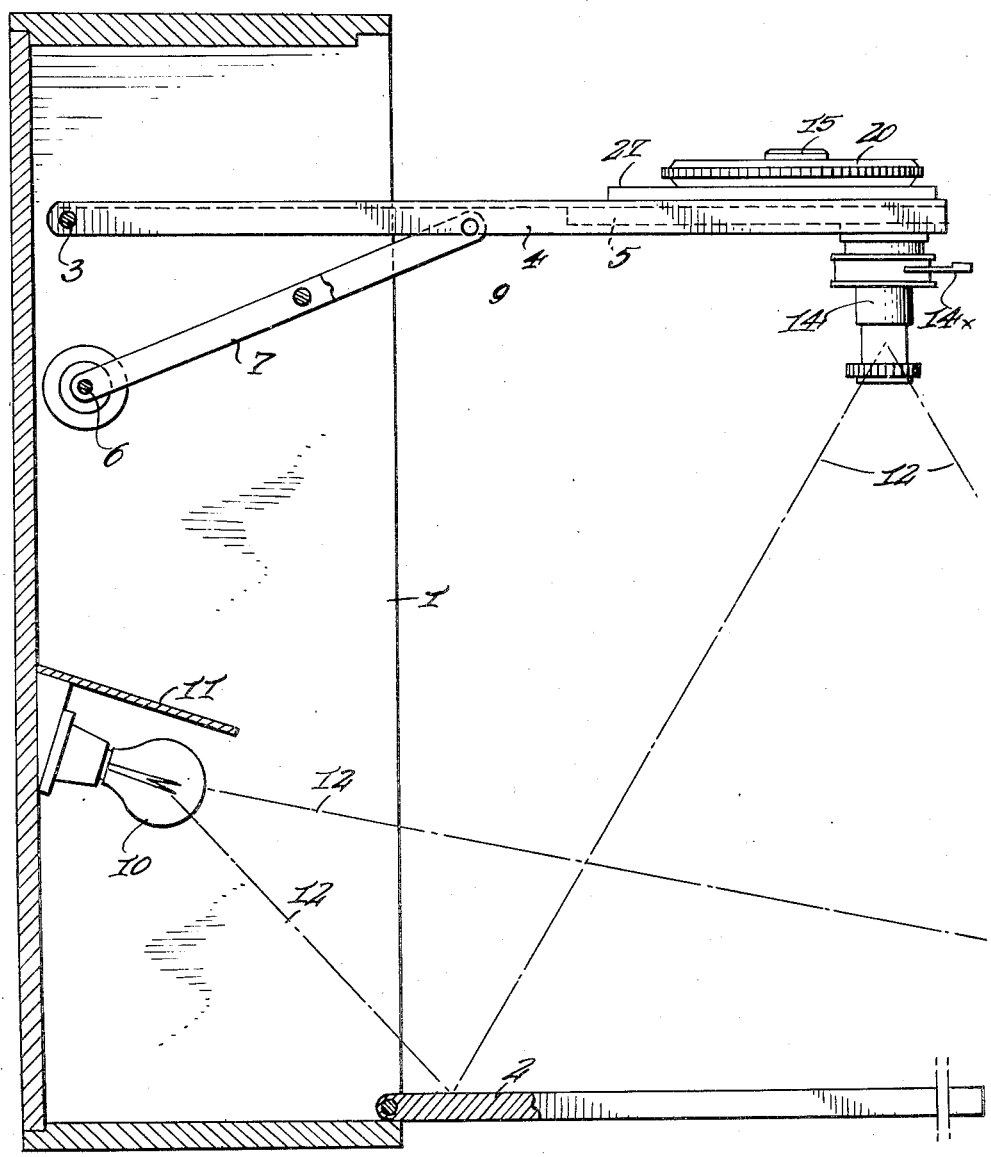
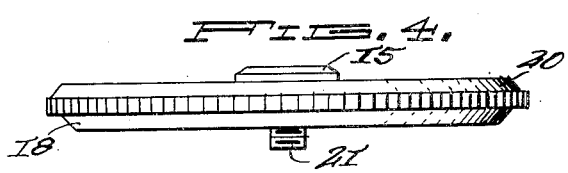

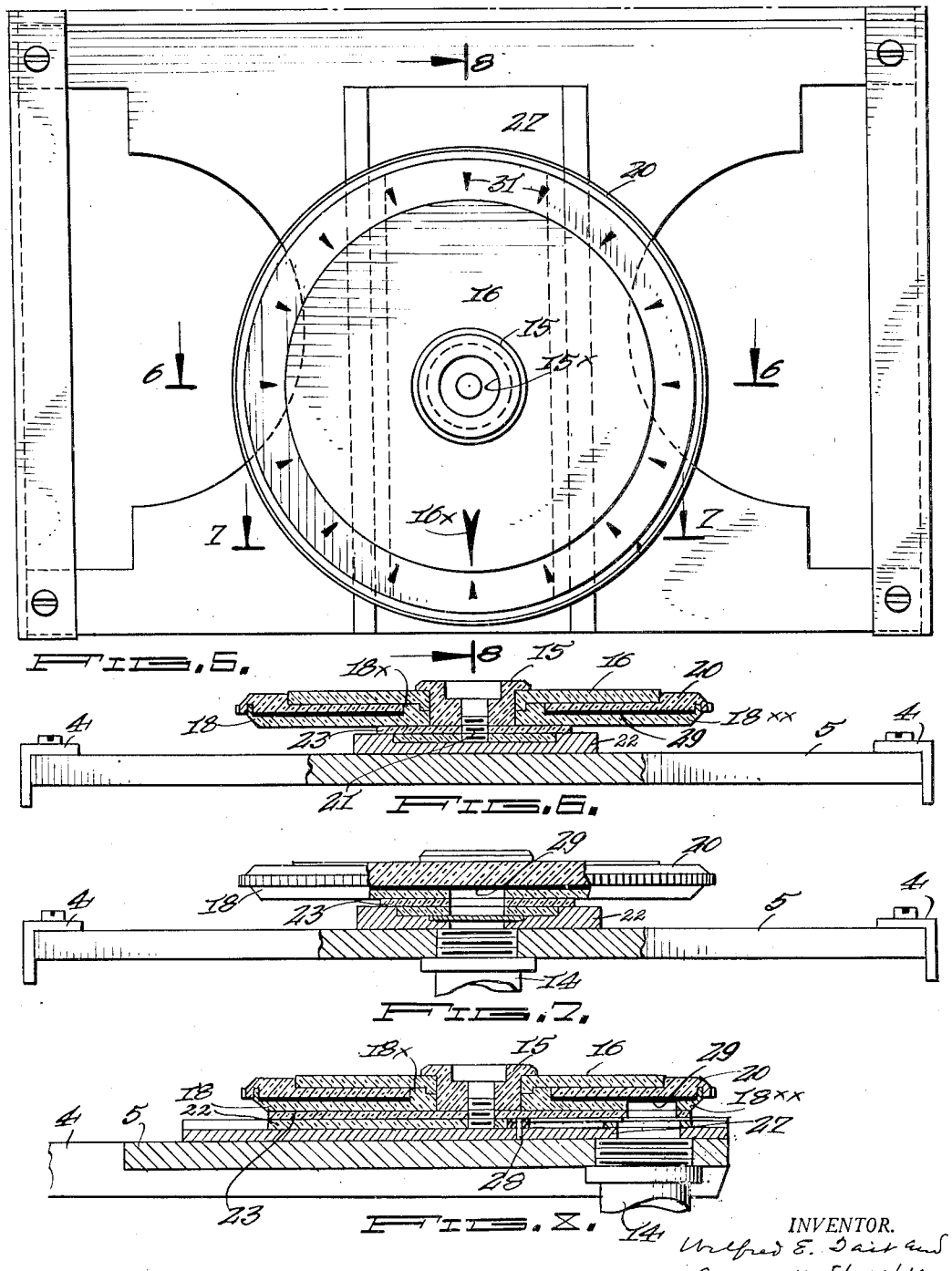

Patented Jan. 10, 1950

2,494,495

UNITED STATES PATENT OFFICE 2,494,495

ROTARY FILM HOLDER

Wilfred E. Tait, Westport, and August W. Stellpflug, Weston, Conn., assignors to American Safety Razor Corporation, Brooklyn, N. Y.

Application June 20, 1945, Serial No. 600,560

1 Claim. (Cl. 95—38)

The object of the present invention is to provide a simple and effective camera which will employ a flat, light weight holder for a sensitized negative and which will embody a rotary element for rotating the negative, step-by-step, so that a plurality of images in ring-formation may be produced upon the negative.

The invention will be described with reference to the accompanying drawings in which:

Figure 1 is a view in elevation, partly in section, showing the device mounted in a foldable supporting stand, the latter being shown partly in section and including illuminating means for copy to be photographed.

Figure 4 is a view in elevation of the negative holder, the lens being removed.

Figure 5 is an enlarged plan view of the negative holder mounted on a supporting plate of the stand elements.

Figure 6 is a vertical section on the line 6—6 of Figure 5.

Figure 7 is a vertical section on the line 7—7 of Figure 5.

Figure 8 is a vertical section on the line 8—8 of Figure 5.

Figure 9 is a horizontal section on the line 9—9 of Figure 10.

Figure 10 is a view similar to Figure 8 showing the negative holder on the supporting plate and ready to be moved into register with the lens aperture.

Figure 11 is a composite view showing the elements of the negative holder separated.

Figure 2:
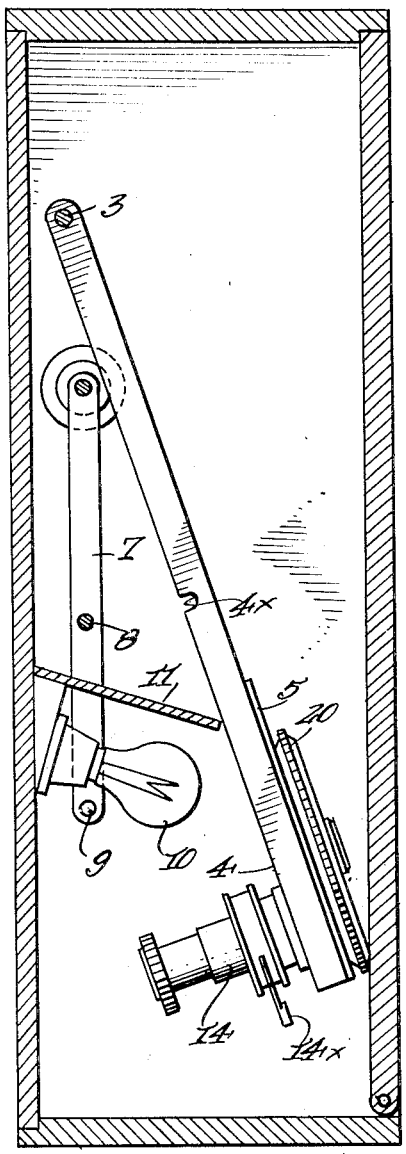
Figure 2 is a view similar to Figure 1 showing the elements folded and the stand closed to box-like form.
Figure 3:
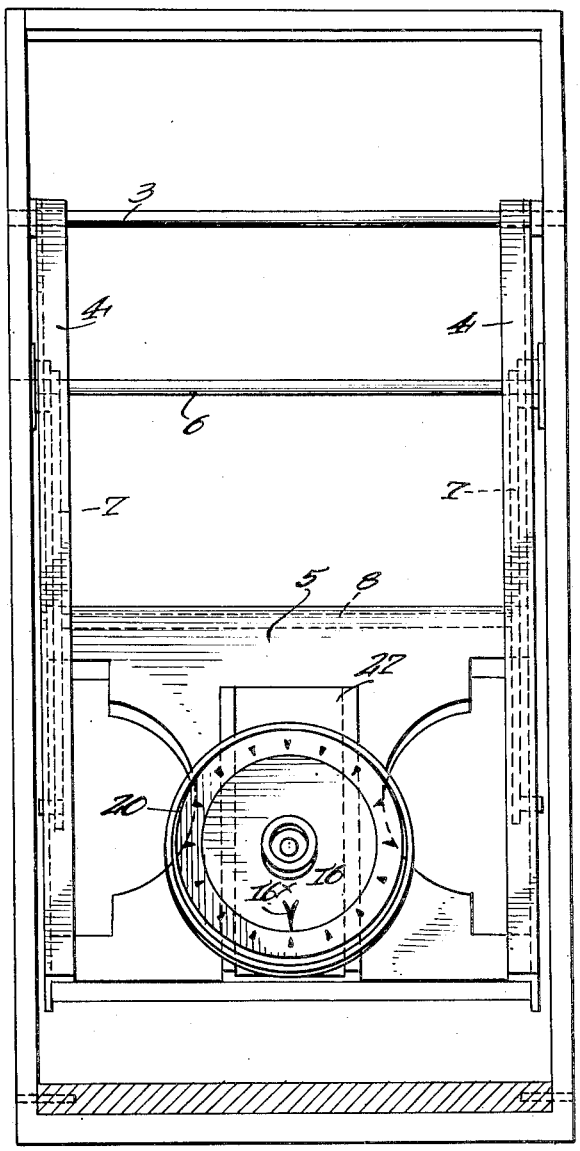
Figure 3 is a front elevation of the structure shown in Figure 2, the closure panel of the frame being moved in horizontal position and broken away.
Figure 12:
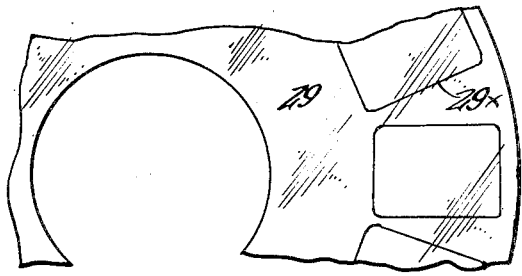
Figure 12 is a fragmentary view of a developed negative disk, the image areas being shown as 29x.

Referring to Figures 1, 2 and 3 of the drawing, we have shown therein a box or cabinet 1 having a hinged or pivoted door 2, forming elements of a "stand." Pivoted on a rod 3, which extends from side to side of the cabinet 1, are the two arms 4 which near their outer ends carry a plate 5. Carried by a rod 6 are two arms 7 and between the arms at their outer ends is a latch bar 9 which will enter sockets at 4x in members 4 to hold the plate 5 in the position of Figure 1, this latching means being quickly releasable to the position of Figure 1.

When cover 2 is swung downwardly, it will serve as a support for the copy to be photographed, and its surface may be utilized also as an image receiving screen when the camera is employed as a projector. For illuminating copy, the cabinet may enclose suitable electrical illuminating elements as indicated at 10, together with an overhead reflector 11, if desired. The dotted lines at 12, Figure 1, indicate a suitable path of light beam for illuminating copy, and the dotted lines at 13 indicate the boundaries of major projection or copy.

The supporting plate 5 is formed with a threaded aperture to receive the threaded end of a copying lens mount 14, and the latter may be of any suitable construction, and may include a shutter and shutter-operating means as indicated at 14x, Figures 1 and 2. When the device is used for projection the lenses of mount 14 will, of course, be of corresponding character.

The camera-projector casing consists of a flanged hub 15, the flange of which overhangs a fixed disk 16, carrying a pin 17 which enters an aperture in an underlying fixed disk 18. Disk 18 is formed with a peripheral ring-like projection which enters an annular peripheral channel in a negative carrying plate 20. Disk 18 is formed with an upwardly projecting hub 18x about which the negative carrier 20 rotates, and the negative holder 20 is counter-sunk to receive disk 16. Disk 18 is formed with an image aperture at 18xx.

Hub 15 is axially apertured and the aperture threaded to receive a threaded stud 21 carried by a plate 22 which may have a facing plate 23 is desired. An area of the upper surface of plate 22 is channeled at 24, Figure 9, to receive a sliding shutter 25 which is adapted to be moved across the image aperture 18xx so as to initially shut out light and subsequently to clear the aperture. The shutter plate 25 carries a depending apertured button 26 so that when the negative holder is placed upon a bracket member 27, and in the position of Figure 10, a pin 28, carried by the bracket member will enter the aperture of the button. Then, when the negative holder is moved forwardly to the position of Figure 8, the pin will hold back the shutter plate 25 and image aperture 28xx will be open at the time the aperture comes into register with the lens mount 14. The shutter lens 14x may then be actuated to expose the negative.

That face of the negative holding disk 20 which receives the negative 29 may carry one or more tiny pins, as indicated by dotted lines at 30, Figure 11. Thus, when the negative carrier is moved step-by-step, it will carry the negative 29 with it.

For purposes of registration, the fixed disk 16 may be marked with an arrow as at 16x, Figure 11, and the margin of the rotary negative carrier 20 may be marked with numerals or other indicia, as at 31, to register with the arrow.

It is intended that the camera casing and immediately connected parts be such that it may be readily transported by mail, loaded with sensitized film at the place of development of the film, and returned to the owner with a fresh film disk. To this end the design is particularly adapted for molded plastic, there being no such reentrant passages as to require the use of complicated dyes. As a matter of fact, the design is such that both plastics and light metal stampings, as for example those of aluminum, etc., may be employed.

The construction is such that dis-assembly of the members is purposely made difficult without the use of a special tool, although such tool is very simple. The tool will be a wrench having an annular expanding head to fit within the cup-like socket at 15x, of the flanged hub 15. When the head is thus applied and expanded, the wrench will rotate the hub until it clears the threaded stud 21 and thus the positive connection of the parts will be released. After an exposed film disk is removed and a fresh disk 29 is applied, the parts may readily be assembled by placing them together and rotating the hub 15.

The provision of the light-shielding shutter slide 25 enables the lens mounting to be carried separately, and a variety of lens assemblies may be used. Although the device includes a rotary element, i. e., the negative carrier, adequate light-shielding is provided by the upwardly extending peripheral ring of disk 18 and the channelway of the negative carrier into which the ring slidingly fits. It will be also noted that the manner in which the top disk 16 is associated with the rotary carrier, with hub 15, assures adequate light barrier.

The device enables the use of very inexpensive film, since it is not rolled or folded, but is merely a flat disk-like sheet which is not changed in its position relative to the rotary carrier during the exposure of all of its image frames.

It will be understood that various modifications may be made in the form and arrangement of the elements constituting the embodiment illustrated, without departing from the spirit of the invention.

Having thus described our invention, and illustrated its use, what we claim as new and desire to secure by Letters Patent, is:

Photographic apparatus consisting of a plate carrying a threaded stud, the hub having a threaded aperture adapted to receive said stud, the hub having a peripheral flange which surrounds a socket depression in the hub, a rotary film carrier having a counter-sunk upper face and an underlying annular channel, the film carrier having a cavity adapted to receive a disk-like negative formed with a central aperture, a disk-like plate within the counter-sunk face of the film carrier and apertured to receive said hub, a disk-like plate closing the film cavity of the film carrier and having a ring projection entering the annular channel of said film carrier, and means associated with said hub for securing the elements in connection whilst permitting rotation of the film carrier and said rotary film carrier having a diameter larger than said stud carrying plate and said disklike plates so as to be accessible from the outside for direct rotation.

WILFRED E. TAIT.
AUGUST W. STELLPFLUG.

REFERENCES CITED

The following references are of record in the file of this patent:

UNITED STATES PATENTS

| Number | Name | Date |
| --- | --- | --- |
| 46,503 | Shute | Feb. 21, 1865 |
| 517,539 | Casler | Apr. 3, 1894 |
| 1,127,539 | Stern | Feb. 9, 1915 |
| 1,282,373 | Browning | Oct. 22, 1918 |
| 1,434,026 | Sandell | Oct. 31, 1922 |
| 1,570,453 | Smith | Jan. 19, 1926 |
| 1,722,573 | Hirsch | July 30, 1929 |
| 1,794,279 | Dauge | Feb. 24, 1931 |
| 1,900,730 | Petit | Mar. 7, 1933 |
| 2,133,581 | Simmon | Oct. 18, 1938 |
| 2,188,974 | Dilks, Jr. | Feb. 6, 1940 |
| 2,223,148 | Fullerton | Nov. 26, 1940 |

FOREIGN PATENTS

| Number | Country | Date |
| --- | --- | --- |
| 388,577 | Germany | Jan. 15, 1924 |